(12) United States Patent
Zhao et al.

(10) Patent No.: US 11,698,904 B2
(45) Date of Patent: Jul. 11, 2023

(54) QUERY REWRITE FOR LOW PERFORMING QUERIES BASED ON CUSTOMER BEHAVIOR

(71) Applicant: Home Depot Product Authority, LLC, Atlanta, GA (US)

(72) Inventors: Meng Zhao, Atlanta, GA (US); James Morgan White, Atlanta, GA (US); Faizan Javed, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 161 days.

(21) Appl. No.: 17/011,674

(22) Filed: Sep. 3, 2020

(65) Prior Publication Data

US 2021/0073224 A1 Mar. 11, 2021

Related U.S. Application Data

(60) Provisional application No. 62/896,404, filed on Sep. 5, 2019.

(51) Int. Cl.
*G06F 7/00* (2006.01)
*G06F 16/2453* (2019.01)
*G06F 16/248* (2019.01)
*G06Q 30/0251* (2023.01)
(Continued)

(52) U.S. Cl.
CPC .... *G06F 16/24534* (2019.01); *G06F 16/2237* (2019.01); *G06F 16/2282* (2019.01); *G06F 16/235* (2019.01); *G06F 16/248* (2019.01); *G06Q 30/0256* (2013.01)

(58) Field of Classification Search
CPC .......... G06F 16/3338; G06F 16/24539; G06F 16/248; G06F 16/9535; G06F 16/24534; G06F 16/2425; G06F 16/2237; G06F 16/2282; G06F 16/235; G06Q 30/0256
See application file for complete search history.

(56) References Cited

U.S. PATENT DOCUMENTS

| | | |
|---|---|---|
| 7,856,441 B1 | 12/2010 | Kraft et al. |
| 8,732,222 B2 | 5/2014 | Horvitz et al. |
| 8,782,069 B2 | 7/2014 | Jockish et al. |

(Continued)

OTHER PUBLICATIONS

ISA/US, Int'l Search Report and Written Opinion issued in PCT/US20/49403, dated Dec. 8, 2020, 7 pgs.

(Continued)

*Primary Examiner* — Mohammad A Sana
(74) *Attorney, Agent, or Firm* — Greenberg Traurig, LLP (57) ABSTRACT

A method includes receiving a plurality of product query arrays each including a plurality of individual product queries received during a single user search session. The method further includes inputting the plurality of product query arrays into the query rewrite model. Text of each of the plurality of individual product queries in each product query array is treated as a whole token. The method further includes receiving a product query from a user electronic device. The method further includes determining a query rewrite for the product query using the query rewrite model and determining search results for the product query using the query rewrite. The method further includes sending information for presenting the search results on a display of the user electronic device responsive to the product query.

28 Claims, 4 Drawing Sheets

(51) Int. Cl.
  *G06F 16/22* (2019.01)
  *G06F 16/23* (2019.01)

(56) References Cited

U.S. PATENT DOCUMENTS

| | | | |
|---|---|---|---|
| 9,031,937 | B2 | 5/2015 | Guha |
| 9,165,033 | B1 | 10/2015 | Tucker et al. |
| 9,830,392 | B1 | 11/2017 | Garg et al. |
| 10,268,646 | B2 | 4/2019 | Jaech et al. |
| 10,685,017 | B1* | 6/2020 | Tucker .............. G06F 16/24539 |
| 2010/0010959 | A1* | 1/2010 | Broder ................ G06F 16/3338 |
| 2011/0035397 | A1 | 2/2011 | Joshi et al. |
| 2016/0125028 | A1* | 5/2016 | Silvestri .............. G06F 16/3338 707/718 |
| 2017/0124091 | A1 | 5/2017 | Nowak-Przygodzki et al. |
| 2017/0242886 | A1 | 8/2017 | Jolley et al. |
| 2018/0060421 | A1 | 3/2018 | Castelli et al. |
| 2018/0095967 | A1 | 4/2018 | Kota |
| 2018/0349472 | A1 | 12/2018 | Kohlschuetter et al. |
| 2019/0361870 | A1 | 11/2019 | Lai |
| 2022/0083548 | A1* | 3/2022 | Thiyagarajan ...... G06F 16/2393 |

OTHER PUBLICATIONS

Mitra, Exploring Session Context using Distributed Representations of Queries and Reformulations, SIGIR '15 Proceedings of the 38th International ACM SIGIR Conference on Research and Development in Information Retrieval, 2015, [retrieved on Nov. 4, 2020], Retrieved from the Internet <URL:https://www.microsoft.com/en-us/reserach/wp-content/uploads/2015/08/sigirfp093-mitra.pdf>, 10 pgs.

Mihajlo Grbovic, Nemanja Djuric, Vladan Radosavljevic, Fabrizio Silvestri and Narayan Bhamidipati, Context-and Content-aware Embeddings for Query Rewriting in Sponsored Search, Yahoo Labs, 10 pgs.

Bhogal, J., Macfarlane, A., and Smith, P. (2007a/b). A review of ontology based query expansion. Inf. Process. Manage., 43 (4):866-886.

Carlson, J. L. (2013). Redis in Action. Manning Publications Co., Greenwich, CT, USA.

Cochran, W. G. (1977). Sampling Techniques, 3rd Edition. John Wiley, entire document.

Gaasterland, T. (1997). Cooperative answering through controlled query relaxation. IEEE Expert: Intelligent Systems and Their Applications, 12(5):48-59.

Graves, A. (2012). Supervised Sequence Labelling with Recurrent Neural Networks, vol. 385 of Studies in Computational Intelligence, entire document.

Mills, T. C. (1990). Time series techniques for economists. Cambridge University Press, Cambridge, entire document.

Parikh, N., Sriram, P., and Hasan, M. A. (2013). On segmentation of ecommerce queries. In CIKM.

Bai, J., Nie, J.-Y., and Cao, G. (2006). Context-dependent term relations for information retrieval. In of the 2006 Conference on Empirical Methods in Language Processing, EMNLP '06, pp. 551-559, Stroudsburg, PA, USA. Association for Computational Linguistics, 9 pgs.

Bengio, Y., Ducharme, R., Vincent, P., and Janvin, C. (2003). A neural probabilistic language model. J. Mach. Learn. Res., 3:1137-1155.

Bhogal, J., Macfarlane, A., and Smith, P. (2007a). A review of ontology based query expansion. Inf. Process. Manage., 43(4):866-886.

Bhogal, J., MacFarlane, A., and Smith, P. J. (2007b). A review of ontology based query expansion. Inf. Process. Manage., 43:866-886.

Carpineto, C. and Romano, G. (2012). A survey of automatic query expansion in information retrieval. ACM Comput. Surv.,44(1):1:1-1:50.

Cochran, W. G. (1977). Sampling Techniques, 3rd Edition. John Wiley.

Devlin, J., Chang, M.-W., Lee, K., and Toutanova, K. (2018). Bert: Pre-training of deep bidirectional transformers for language understanding. arXiv preprint arXiv:1810.04805.

Diaz, F., Mitra, B., and Craswell, N. (2016). Query expansion with locally-trained word embeddings. ArXiv, abs/1605.07891.

Goldberg, Y. and Levy, O. (2014). word2vec explained: deriving mikolov et al.'s negative-sampling word-embedding method. CoRR, abs/1402.3722.

Goodfellow, I., Bengio, Y., and Courville, A. (2016). Deep Learning. MIT Press, http://www.deeplearningbook.org.

Graves, A. (2012). Supervised Sequence Labelling with Recurrent Neural Networks, vol. 385 of Studies in Computational Intelligence. Springer.

Hagen, M., Potthast, M., Stein, B., and Bräutigam, C. (2011). Query segmentation revisited. In Proceedings of the 20th International Conference on World Wide Web, WWW '11, pp. 97-106, New York, NY, USA. ACM.

Hasan, M. A., Parikh, N., Singh, G., and Sundaresan, N. (2011). Query suggestion for e-commerce sites. In Proceedings of the Fourth ACM International Conference on Web Search and Data Mining, WSDM '11, pp. 765-774, New York, NY, USA. ACM.

Hochreiter, S. and Schmidhuber, J. (1997). Long short-term memory. Neural Comput., 9(8):1735-1780.

Huang, J. and Efthimiadis, E. N. (2009). Analyzing and evaluating query reformulation strategies in web search logs. In Proceedings of the 18th ACM Conference on Information and Knowledge Management, CIKM '09, pp. 77-86, New York, NY, USA. ACM.

Joulin, A., Grave, E., Bojanowski, P., and Mikolov, T. (2017). Bag of tricks for efficient text classification. In Proceedings of the 15th Conference of the European Chapter of the Association for Computational Linguistics: vol. 2, Short Papers, pp. 427-431. Association for Computational Linguistics.

Kohavi, R. (2001). Mining e-commerce data: the good, the bad, and the ugly. In KDD.

Kuzi, S., Shtok, A., and Kurland, O. (2016). Query expansion using word embeddings. In Proceedings of the 25th ACM International on Conference on Information and Knowledge Management, CIKM '16, pp. 1929-1932, New York, NY, USA. ACM.

Levy, O. and Goldberg, Y. (2014). Linguistic regularities in sparse and explicit word representations. In In Proceedings of the Thirteenth Conference on Computational Natural Language Learning (CoNLL).

Loper, E. and Bird, S. (2002). Nltk: The natural language toolkit. In Proceedings of the ACL-02 Workshop on Effective Tools and Methodologies for Teaching Natural Language Processing and Computational Linguistics—vol. 1, ETMTNLP '02, pp. 63-70, Stroudsburg, PA, USA. Association for Computational Linguistics.

Manning, C. D., Surdeanu, M., Bauer, J., Finkel, J., Bethard, S. J., and McClosky, D. (2014). The Stanford CoreNLP natural language processing toolkit. In Association for Computational Linguistics (ACL) System Demonstrations, pp. 55-60.

Mikolov, T., Sutskever, I., Chen, K., Corrado, G., and Dean, J. (2013). Distributed representations of words and phrases and their compositionality. In Proceedings of the 26th International Conference on Neural Information Processing Systems—vol. 2, NIPS' 13, pp. 3111-3119, USA. Curran Associates Inc.

Mills, T. C. (1990). Time series techniques for economists. Cambridge University Press, Cambridge.

Mueller, J. and Thyagarajan, A. (2016). Siamese recurrent architectures for learning sentence similarity. In AAAI.

Neculoiu, P., Versteegh, M., and Rotaru, M. (2016). Learning text similarity with Siamese recurrent networks. In Rep4NLP@ACL.

Peters, M. E., Neumann, M., Iyyer, M., Gardner, M., Clark, C., Lee, K., and Zettlemoyer, L. (2018). Deep contextualized word representations. In Proc. of NAACL.

Qiu, Y. and Frei, H.-P. (1993). Concept based query expansion. In Proceedings of the 16th Annual International ACM SIGIR Conference on Research and Development in Information Retrieval, SIGIR '93, pp. 160-169, New York, NY, USA. ACM.

Rong, X. (2014). word2vec parameter learning explained. arXiv preprint arXiv:1411.2738.

(56) References Cited

OTHER PUBLICATIONS

Roy, D., Paul, D., Mitra, M., and Garain, U. (2016). Using word embeddings for automatic query expansion. ArXiv, abs/1606.07608.
Russell, S. and Norvig, P. (2009). Artificial Intelligence: A Modem Approach. Prentice Hall Press, Upper Saddle River, NJ, USA, 3rd edition.
Singh, G., Parikh, N., and Sundaresan, N. (2012). Rewriting null e-commerce queries to recommend products. In Proceedings of the 21st International Conference on World Wide Web, WWW '12 Companion, pp. 73-82, New York, NY, USA. ACM.
Song, M., Song, I.-Y., Hu, X., and Allen, R. B. (2007). Integration of association rules and ontologies for semantic query expansion. Data Knowl. Eng., 63(1):63-75.
Tan, Z., Xu, C., Jiang, M., Yang, H., and Wu, X. (2017). Query rewrite for null and low search results in ecommerce. In eCOM@SIGIR.
Zamani, H. and Croft, W. B. (2016). Embedding-based query language models. In Proceedings of the 2016 ACM International Conference on the Theory of Information Retrieval, ICTIR'16, pp. 147-156, New York, NY, USA. ACM.
Graves, A. (2012). Supervised Sequence Labelling with Recurrent Neural Networks, vol. 385 of Studies in Computational Intelligence.
Russell, S. and Norvig, P. (2009). Artificial Intelligence: A Modem Approach. Prentice Hall Press, Upper Saddle River, NJ, USA, 3rd edition. B.
Grbovic, M., et al. Context-and Content-aware Embeddings for Query Rewriting in Sponsored Search, Yahoo Labs, London, England, Proceedings of the 38th international Acm Sigir conference on research and development in information retrieval. 2015, 10 pgs.

\* cited by examiner

QUERY REWRITE FOR LOW PERFORMING QUERIES BASED ON CUSTOMER BEHAVIOR

CROSS-REFERENCE TO RELATED APPLICATIONS

This application claims priority to U.S. Provisional Application Ser. No. 62/896,404, filed Sep. 5, 2019, which is hereby incorporated by reference in its entirety.

BACKGROUND

Both a retailer and its customers can benefit from the retailer providing relevant results to the search terms of a query used by a customer to look for products. The retailer may provide such search results on a website, in a brick-and-mortar store, or otherwise. Providing more relevant search results in response to queries from a customer may improve the experience of the user so that the user does not have to enter multiple search queries, look for the product from another retailer, or does not find the product of interest at all. Providing more relevant search results may also reduce the load on the retailer's servers by decreasing the number of searches needed by a user to find desired items.

SUMMARY

An illustrative computer-implemented method includes receiving, by one or more processors of one or more computing devices, a plurality of product query arrays, each including a plurality of individual product queries received during a single user search session. The illustrative method further includes inputting, by the one or more processors, the plurality of product query arrays into the query rewrite model. Text of each of the plurality of individual product queries in each product query array may be treated as a whole token. The illustrative method further includes receiving, by the one or more processors, a product query from a user electronic device. The illustrative method further includes determining, by the one or more processors, a query rewrite for the product query using the query rewrite model. The illustrative method further includes determining, by the one or more processors, search results for the product query using the query rewrite. The illustrative method further includes sending, by the one or more processors to the user electronic device, information for presenting the search results on a display of the user electronic device responsive to the product query.

An illustrative computer-implemented method includes receiving, by one or more processors of one or more computing devices, a product query from a user electronic device. The illustrative method further includes determining, by the one or more processors, a query rewrite for the product query based on a query rewrite model. The query rewrite model may be configured to determine the query rewrite by comparing the product query to vectors representing a plurality of product query arrays, each comprising a plurality of individual product queries received during a single user search session. Text of each of the plurality of individual product queries in each product query array may be treated as a whole token. The query rewrite model may be further configured to determine the query rewrite by determining one of the vectors that is closest to a product query vector and determining a query rewrite based on the determined one of the vectors. The illustrative method further includes determining, by the one or more processors, search results for the product query using the query rewrite. The illustrative method further includes sending, by the one or more processors to the user electronic device, information for presenting the search results on a display of the user electronic device responsive to the product query.

An illustrative computer-implemented method includes receiving, by one or more processors of one or more computing devices, a product query from a user electronic device. The illustrative method further includes determining, by the one or more processors, a query rewrite for the product query by retrieving, from a lookup table, a query rewrite candidate related to the product query. The lookup table may be generated using a query rewrite model by inputting a plurality of product query arrays, each comprising a plurality of individual product queries received during a single user search session into the query rewrite model. Text of each of the plurality of individual product queries in each product query arrays may be treated as a whole token. The lookup table may be generated using a query rewrite model by generating vectors representing the plurality of product query arrays, determining a query rewrite candidate for each of the vectors, and storing the vectors and each respective query rewrite candidate in the lookup table. The illustrative method further includes determining, by the one or more processors, search results for the product query using the query rewrite. The illustrative method further includes sending, to the user electronic device, information for presenting the search results on a display of the user electronic device responsive to the product query.

DETAILED DESCRIPTION

Consumers often use e-commerce websites to shop for products and services. In order to find those products and services, the users may enter queries or searches for products they are looking for. However, individual users may not all use the same wording to describe a product, project, or service, and may not use the same wording as a retailer operating an e-commerce website. To reduce user frictions if the user does not enter precise search terms (or the same terms as the retailer or other operator of the website) and to improve search relevancy, the methods and systems herein describe a query rewrite system that may, for example, leverage large-scale in-session user behavior to increase accuracy of search results without compromising an original query intent. The systems and methods described herein may also estimate user intent of a query even if the original query is broad.

Although embodiments herein are described with respect to product queries for an e-commerce website, the methods and systems described herein are not so limited. For example, the methods and systems described herein may be used for any type of queries, such as general search engine queries or any other type of searching where text based queries are used. Furthermore, the methods and systems described herein may be used to search for any type of items or other information.

As a non-limiting example, vocabulary used by users in queries for products used in home remodeling may not match vocabulary used in product information provided by the manufacturer or retailer, for example. Such a mismatch may have several origins. For example, product titles and descriptions are often prescribed professionally in the context of the product space, whereas many customers may have relatively little knowledge of the product space. Further, trade names for products may vary from the product titles and descriptions, and users may be more familiar with such trade names than with product titles. Finally, different customers of different levels of sophistication may have different understandings of products, their features, and the terminology typically associated with the products. For example, customers may be accustomed to unoriginal nomenclatures or use queries with inadequate specific information about a product or a type or category of product they are seeking. Such vocabulary mismatches between customer queries and product terms may reduce user discovery of the desired items, and thus may reduce the effectiveness of search functionality. Manually updating ontologies, knowledge bases, product information, etc. could improve vocabulary matches, but such solutions may not be sustainable in practice, as millions of items may be added to the set of items searched each year, and billions of unique searches may be conducted each year.

Other techniques for solving these problems may also have deficiencies. For example, query relaxation and query expansion techniques may be used to handle vocabulary mismatch issues. These techniques remove or add tokens (e.g., words) or phrases from a query. However, such operations may not be helpful for certain vocabulary mismatches. For example, for the search query consisting of two words, query relaxation may prioritize search results relating to only one of the terms, or query expansion may prioritize only one of the terms. Therefore, where the two terms have significantly different denotations, which denotations are also significantly different from the meaning of the combined terms, the products retrieved may be products may be related to only one of the two search terms, which may be very different from the user's intent.

Accordingly, the present disclosure includes systems and methods for using a query rewrite model to rewrite user queries to a more relevant search query so that a search returns more relevant results to the user in cases of a vocabulary mismatch. This may be accomplished because customer behavior may be such that, during a single session, a user may enter multiple queries relating to the same subject or product until the user finds the product they are looking for. That is, the user may refine their search terms manually until they find the desired product. For example, a user may focus on a single home remodeling project within a given online session, such as fixing a running toilet. Such a user may search and browse products related mostly or fully related to fixing toilets within a single search session (as opposed to searching for multiple topics in a single search session). This in-session customer behavior may be leveraged as described herein to implement methods and systems of including a scalable solution for generating query rewrite candidates.

Providing search results that are more relevant to user search terms/queries using a query rewrite model according to the present disclosure may allow a user to more quickly find, view, and/or purchase an item they desire through an electronic interface, such as a website. In various embodiments, the interface may show the user how their search terms were rewritten to achieve better results, or the interface may appear as if the search results are the result of only using the search terms entered by a user (even if the query has been rewritten to perform the search). In various embodiments, graphical control elements may be provided that enable the user to select and purchase a product found using query rewrite. This may improve the user experience by reducing user time and effort by reducing the number of user queries needed to find a desired product or other item.

As a result, providing product collections according to the techniques of the present disclosure solves an internet-centric problem—streamlining user queries with a website or other electronic user interface—through methods and systems necessarily rooted in computer technology. Additionally, the techniques described herein improve the functionality of a website accessed by a user. For example, according to the various techniques described herein, a database or lookup table built using a query rewrite model as described herein may be built before a user accesses the website and begins to perform queries. Because the database or lookup table of query rewrite candidates is already established, the proper query rewrite relevant to a query performed by a user may be quickly looked up in the database or lookup table and used to perform the query, resulting in faster and smoother website operation relative to determining query rewrites dynamically. Using such techniques, the product(s) in a collection can be looked up and loaded onto the website interface viewed by the user faster than determining a query rewrite from large amounts of in-session user data to using a query rewrite model each time a user makes a query.

In addition, the methods and systems described herein may provide an improved graphical user interface (GUI). Displaying more relevant search results to a user is a demonstrable improvement that allows a user to quickly and easily select, unselect, add to a cart, purchase, view, and otherwise interact with desired products or other items on an interface, such as a webpage. In other words, the methods and systems herein provide for a particular manner of summarizing and presenting information by and on electronic devices, and include specific manners of displaying a limited set of relevant information to a user, rather than using conventional search methods to display generic irrelevant information on a computer. In particular, the improved interfaces described herein prevent a user from having to perform multiple queries and view the results of those queries on more than one interface or webpage. This allows a user to see the most relevant data quickly, and saves the user from the time and hassle of navigating through multiple interfaces and webpages.

First, with respect to FIGS. 1 and 2, an illustrative method and illustrative system for automatically presenting search results using a query rewrite for a product query to a user will be described at a high level. With respect to FIG. 3, an illustrative method for using a query rewrite model to build a lookup table will be described. Finally, with respect to FIG. 4, an illustrative computing environment that may be used in conjunction with the methods and processes of this disclosure will be described.

Figure 1:
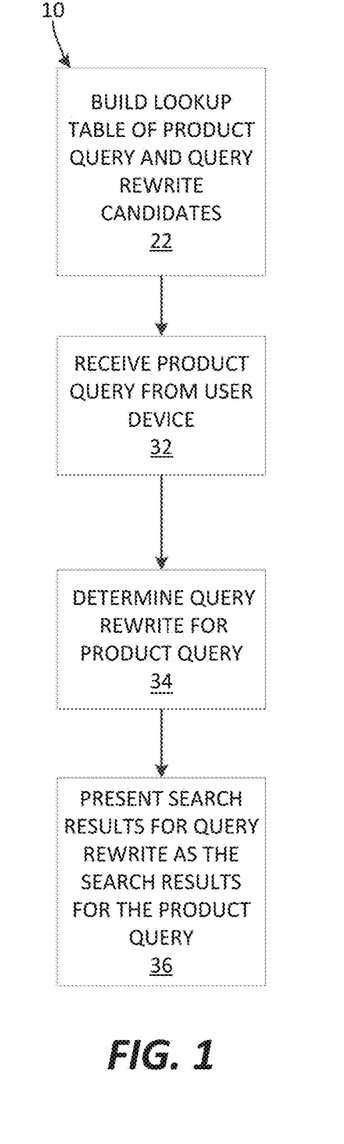
FIG. 1 is a flow chart illustrating an example method of presenting search results using a query rewrite for a product query to a user, in embodiments.

Referring to the drawings, in which like numerals refer to the same or similar features in the various views, FIG. 1 is a flow chart of an illustrative method 10 for presenting search results using a query rewrite for a product query to a user. FIG. 2 is a block diagram of an illustrative system 12 for providing search results using a query rewrite to a user. The method 10 of FIG. 1 and the system 12 of FIG. 2 are described in conjunction below.

Generally, the method 10 may include building a lookup table of query rewrite candidates and using that lookup table to determine query rewrites for user product queries to return more relevant search results to a user. The system 12 generally includes computer hardware and functional capability for carrying out the method 10 and other methods and functions of this disclosure. The system 12 may include a user query, session, and click-through database 14, a query rewrite processing system 16, and a server 18 in electronic communication with a plurality of user devices $20_1$, $20_2$, ... $20_N$, which may be referred to individually as a user device 20 or collectively as user devices 20. The system 12 may also perform other methods of this disclosure and may provide one or more electronic user interfaces and/or graphical presentations to the user. The system 12 may also host or otherwise provide one or more websites, mobile applications, and the like, in embodiments.

The method 10 will be described in terms of a user, such as a customer, interacting with a website. The server 18 may host or provide that website, and accordingly may receive input from the user through the website. The server 18 may exchange information with the query rewrite processing system 16 to carry out one or more steps of the method 10, in embodiments. In other embodiments, the server 18 and the query rewrite processing system 16 may be the same processing system or apparatus.

The method 10 may be performed, in part or in full, by a retailer, in embodiments. That is, the system 12 may be owned or operated by or on behalf of a retailer, in embodiments. The method 10 may also be carried out, in full or in part, by some other type of entity. A website having the features referenced herein may be the website of a retailer, and the brick-and-mortar stores referenced herein may be stores of the same retailer. Additionally or alternatively, a website having the features described herein and the brick-and-mortar stores may be associated with different entities. A website having the features described herein return results in response to user queries that include various products and/or services, and the website may list and sell products and/or services sold by the retailer, in embodiments. Additionally or alternatively, such a website may list and sell items sold by third parties and may return search results related to those items using the query rewrite methods and systems described herein.

The method 10 may include a step 22 of building a lookup table of product query and product query rewrite candidates using query rewrite model 24. Such a lookup up table may cross-reference different potential user queries with one or more respective query rewrites per user query. An embodiment of the step 22 is illustrated in and will be described (as a method) in greater detail with respect to FIG. 3. With continued reference to FIGS. 1 and 2, the lookup table building step 22 may generally include the query rewrite model 24 using records of user queries, in-session user data, and user click-through information in the database 14 to build lookup tables 30. The query rewrite model 24 may be used to build the lookup tables 30 so that user queries may be rewritten to return more relevant results to a user as described herein.

Figure 2:
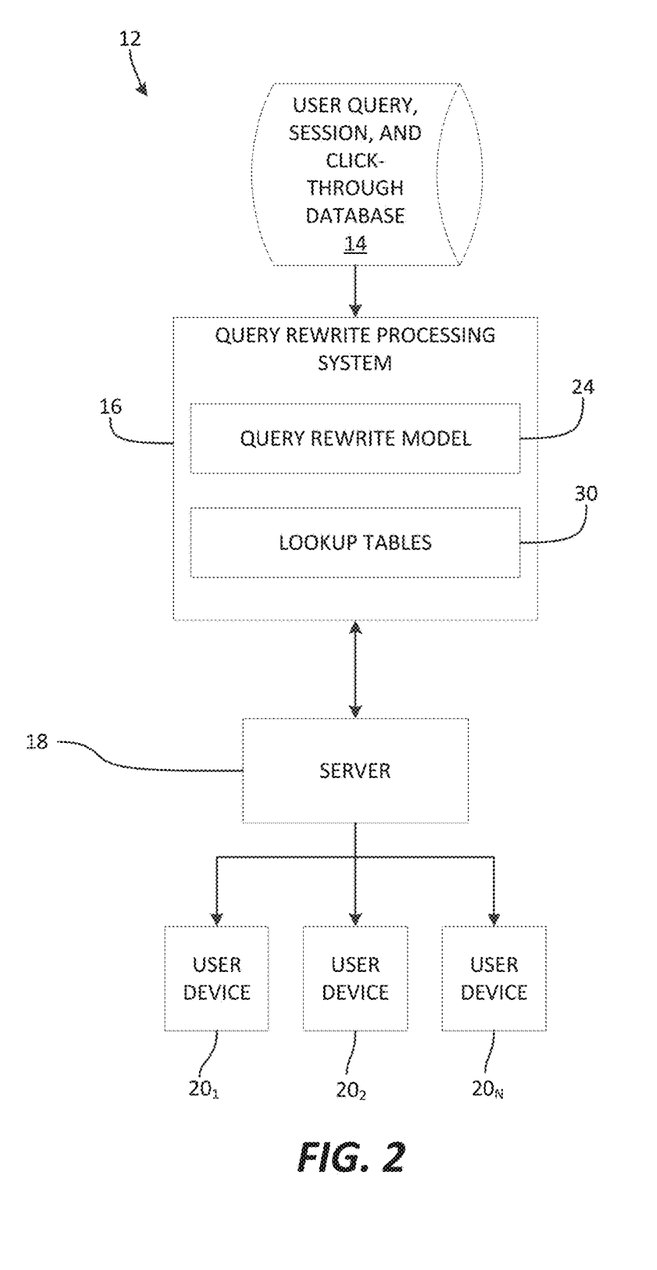
FIG. 2 is a block diagram view of an example system for providing search results using a query rewrite to a user, in embodiments.

With continued reference to FIGS. 1 and 2, the method 10 may further include a step 32 of receiving a product query from a user device. The selection may be received, for example, by the query rewrite processing system 16 from a user device 20 through a website provided by the server 18 or through another electronic user interface such as a mobile application, in-store kiosk, etc. As noted above, the website may be, for example, an e-commerce site associated with or operated by or on behalf of a retailer. The product query may be, for example, text entered through a physical or digital keyboard or voice-to-text software, audio spoken to a digital assistant (e.g., Google Home™, Amazon Alexa™, Apple Siri™), etc. For example, a product query may be received from a user through a voice search or request through the electronic user interface.

In one embodiment, the electronic user interface with which the user interacts may be on a mobile application, and the mobile application may be configured to capture voice search requests from the user. The server 18 or user device 20 may be configured with voice recognition software to parse the user's voice search or voice request to determine a desired product query for which query rewrites should be determined. In response to the voice search or voice request query, the server may determine a query rewrite for finding search results and provide those search results to the user through the electronic user interface, as described below.

In another embodiment, a product query may be received from a user through a text-message-based (e.g., SMS or MMS) request. For example, the user may transmit a text message including a product query from a user device 20 and, in response, the server 18 may determine a query rewrite and transmit search results based on the query rewrite to the user device 20.

With continued reference to FIGS. 1 and 2, the method 10 may further include a step 34 of determining a query rewrite for a product query. In other words, after the product query from the user device is received at the step 32, the server 18, for example, may use the lookup tables 30 of the query rewrite processing system 16 to determine a query rewrite for the product query. In some embodiments, the server 18 may determine the "best" or "top" query rewrite. In some embodiments, multiple query rewrites may be determined. In various embodiments, a query rewrite may be determined in other ways (e.g., other than with a lookup table). For example, instead of using a lookup table or database of predetermined query and query rewrite relationships, the query rewrite processing system 16 may determine a query rewrite dynamically in response to a particular product query.

With continued reference to FIGS. 1 and 2, the method 10 may further include a step 36 of presenting the search results for the query rewrite as the search results for the original product query. That is, the server 18 may determine search results based on the query rewrite terms, rather than the product query terms itself as described herein (although the two may be related or similar). The search results may be presented, for example, on a website interface. In addition, the search results may be presented in conjunction with graphical control elements that allows the user to pick different search terms. For example, the user may select their original product query search terms to see the results that would be associated with that search, and may select the query rewrite again to switch back to the search results associated with the query rewrite.

In some embodiments, the query rewrite model 24 may be applied to determine more than one query rewrite candidate for a given product search, and those query rewrite candidates may each be stored in the lookup tables 30. In such embodiments, alternative query rewrite candidates may be displayed along with a query rewrite used to determine search results. A user may select any of the other query rewrite candidates in order to see search results displayed that are associated with a selected query rewrite candidate. Other graphical control elements on an interface such as a website may enable the user to select items in the search result the items, initiate a purchase (e.g., adding to cart), complete a purchase (e.g., checking out, performing a 1-click purchase, etc.), etc., in embodiments.

The method 10 therefore advantageously provides more relevant search results to customers on a website using query rewrites and enables the customers to find and select/purchase products with a reduced number of clicks. Instead of separately running several queries until a desired item is found, the method 10 provides a quicker way for the customer to find a desired product by leveraging the information gathered from past searches by other users. Furthermore, the method 10 reduces the number of pages to which a user must navigate, thereby reducing server workload and improving server functionality.

The "user" noted in the method may be a customer that is shopping on a website provided by the server with a user device 20, in embodiments. The user device 20 may be a personal computer, user mobile computing device, or other computing device. Additionally or alternatively, the server 18 may provide all or part of an in-store checkout or informational environment or digital price display information, and the user devices 20 may be in-store kiosks or digital price displays.

As discussed herein, users may focus multiple queries during a single session on a single product, service project, set of products, etc. For example, for home remodeling projects, a user may do significant research, estimation, comparison, and/or validation before they actually make a purchase. Consequently, the decision-making process may be complex and include multiple steps, such that users may only able to focus on one specific step or goal at a time (e.g., during an online session spent visiting an e-commerce website). For example, when shopping online for a project to install wall tiles in a bathroom, customers may start by understanding specifications of tiles, followed by researching the designs and patterns of the tiles, then trying to collect other tools and materials for the installation before lastly studying related how-to guides. Each individual step or phase may occupy an entire session during each visit to a website. Accordingly, the systems and methods described herein may use a language model to determine query rewrites, but instead of using tokens (e.g., individual words) and sentences (collections of words) as the groupings to feed into the language model, a query rewrite language model may be built using queries as a whole token (in place of using individual words in a search query as tokens) and total in-session data as the sentences (collections of queries as a whole during an online session).

Figure 3:
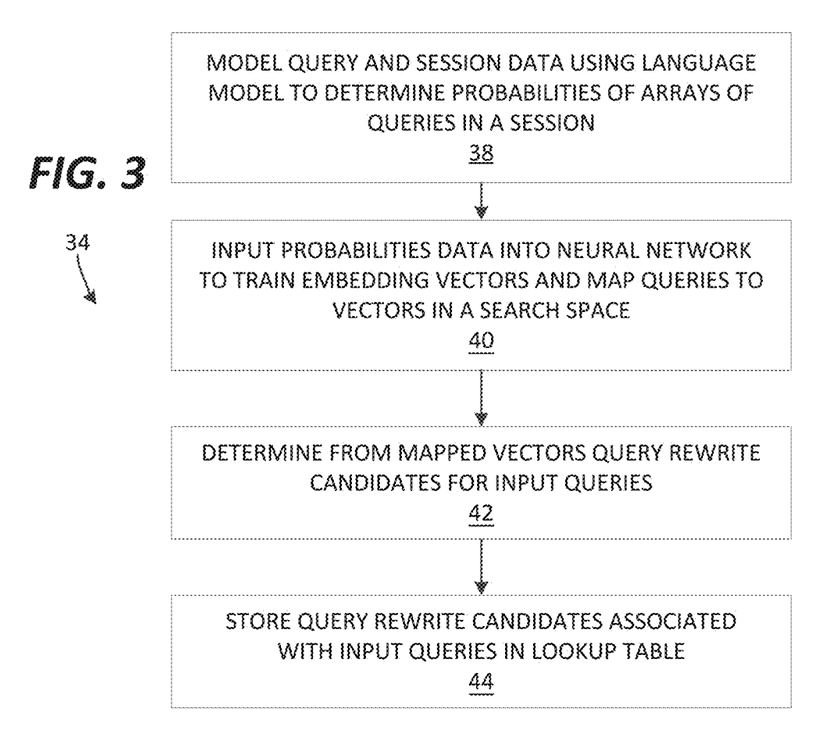
FIG. 3 is a flow chart illustrating an example method of using a query rewrite model to build a lookup table, in embodiments.

FIG. 3 is a flow chart illustrating an embodiment of a method 22 for using a query rewrite model to build a lookup table. The method 22 may find use as the first step 22 in the method 10 of FIG. 1, in an embodiment.

The method 22 may first include a step 38 that includes modeling query and session data using a language model to determine probabilities of arrays of queries in a session (e.g., on a per session basis as described herein. Arrays of queries may be or may include one or more (e.g., a plurality of) queries entered by a user during a single online session of conducting product queries to search for products. The in-session query information used to assemble the arrays of queries arrays may be stored in the database 14 of FIG. 2, for example.

User query sessions may be modeled as described herein according to a language model to determine probabilities of particular arrays in a query session. In other words, the language model may be used to determine how often queries appear together in a single session and/or appear together in a certain order in a single session. Often in using a language model, rules are applied to split up a corpus (body of text) into entities (also called tokens), such that those tokenized entities can be analyzed to determine relationships between them. Often when using language models, entities or tokens are individual words, and the corpus is a larger group of words, such as a sentence, paragraph, page, work, etc. However, according to the methods and systems described herein, individual queries are treated as a whole as entities (e.g., an entire single query is treated as a whole or tokenized) and an overall search session of a user is treated as a corpus when using a language model to model the query and session data. This may be referred to herein as a query-session model, and this query-session model enables training of a model based on the intent of a user over the course of a session, rather than based on only a single search query.

In an example, a unigram language model may be used to model the query and session data in the step 38. In a unigram language model, entities or tokens are considered independently of one another, which simplifies the modeling. Accordingly, when a unigram language model is used to model the query and session data, the tokenized queries amongst each search session may be regarded as independent from one another other, as opposed to other language models such as in n-gram or query segmentation that focuses on individual terms or portions of a query and do not tokenize entire queries as a whole. Unigram language models also have less complexity than language models that do not consider its tokens/entities as independent of one another. Thus, us of a unigram language model may be advantageous because the unigram language model uses less computational resources than other, more complex models. However, for some uses, the simplicity of the unigram language model may cause loss of important information because it considers its entities/tokens independently. However, such a feature is desirable according to various embodiments described herein, because considering the search queries in a session independently is desirable. In other words, the advantages of the unigram language model (simplicity and use of less computational resources) is achieved without the typical downside of the use of a unigram language model (loss of information due to the model's simplicity).

In various embodiments, text cleaning procedures may be used to process query text before the query and session data is modeled at the step 38. For example, natural language processing (NLP) may be applied to text of queries. As another example, lemmatization may be applied to high volume search terms to avoid false positive suggestions. As another example, some or all punctuation may be excluded from the text of queries (e.g., all punctuation may be excluded except for certain quotation marks and apostrophes, as quotation marks and apostrophes may represent important information such as foot and inch, respectively).

Advantageously, since the topic of a given user session may be concentrated (e.g., the user is looking for one thing across multiple search queries in a session), each individual query may be inherently closely related to the context (or other queries) of the session, and hence may be advantageously used to predict other queries within the same session. This assumption that queries in a session are related advantageously enables use of the probabilities for arrays of queries in a session determined in step 38 for determining rewrite candidates for a given user query. In other words, a rewrite candidate for a user query may be determined as described herein based on other queries previous users have searched along with the same or a similar user query. As discussed further below with respect to step 42 of FIG. 3, semantic relations between queries may therefore be learned (e.g., rewrite candidates may be determined) by using a skip-gram model, for example. Skip-gram models receive a target token or entity (e.g., a user query) and output various contexts (e.g., a rewrite candidate) for that token or entity and a probability distribution associated with each of the output contexts (e.g., how likely is the output context token/entity to be found near the input target token/entity).

Single search sessions tokenized by query are also relatively less complex than if a session was tokenized by word of each query in a session. That is, the number of words used in a session is much larger than the total number of queries involved in a session. This may advantageously result in significant complexity reduction for back-propagation, as splits in Huffman trees, for example, may be reduced significantly. In other words, the number of queries in a session may advantageously reduce the complexity of determining query rewrites.

Equations 1-4 below are an example representation of how the probabilities data may be determined according to step 38. A corpus of query and session data (e.g., a clickstream sample) may be defined as C, $s_j(q_i)$, (which may be referred to simply as $s_j$), as session j from C where $q_i$ has been searched for. Using a chain rule of conditional probability that is used to decompose a probability of a sequence of events into the probability of each successive event conditioned on earlier events, we know that $$P(q_1, \ldots, q_n) = \prod_{k=1}^{N} P(q_k \mid q_0, \ldots, q_{k-1}), \quad \text{Equation 1}$$

where $N=|\{q_k: q_k \in s_j\}|$. Equation 1 may be simplified to $$P(q_1, \ldots, q_n) = \prod_{i=1}^{n} P(q_i). \quad \text{Equation 2}$$

Hence, $$P(q_1, \ldots, q_n \mid q_i) = \prod_{k \neq i} P(q_k), \text{ or,} \quad \text{Equation 3}$$

$$P(s_j(q_i) \mid q_i) = \prod_{k \neq i} P(q_k). \quad \text{Equation 4}$$

Equation 4 may therefore represent probability data for arrays of queries in various sessions, and may be used according to the rest of the method 22 to generate query rewrite candidates, and specifically may be used to train embedding vectors in step 40.

The method 22 may further include a step 40 that includes inputting the probabilities data determined in step 38 into a neural network to train embedding vectors that map queries to vectors in a search space. The various queries are mapped to vectors in a search space using the trained embedding vectors. Embedding vectors mathematically map words or phrases as vectors into a search space. In this way, phrases that are slightly different but may have the generally same meaning may be mapped with the same vector or to a very similar vector. These vectors may be used to determine other vectors that are close by in the search space. For example, a user query input at step 32 of FIG. 1 may be mapped to a vector, and other nearby vectors mapped according to step 40 may be determined to find query rewrite candidates (as described with respect to step 42 below). Because the input to train the embedding vectors that map queries into the search space includes the input probabilities data determined in step 38, the probabilities that a query shows up in the same session as another query is incorporated (e.g., a high probability that a query is often found in a session with another query will cause the two vectors to mapped to a similar space). The probabilities data may be input into a neural network language model so that queries that vary slightly may be aggregated or otherwise analyzed together when training the embedding vectors (e.g., queries that are virtually the same need not be mapped to multiple vectors). A query rewrite system may be effective even if a population of queries are approximated (e.g., mapping similar queries to the same vectors) because user queries stabilize as the population of queries increases. In other words, the embedding vectors may be trained using the neural network to map vectors in a particular way. In addition, the number of queries (and subsequent mapped vectors) may be reduced by cleaning up or otherwise parameterizing to data input (e.g., probabilities data) to reduce complexity and number of the output vectors for a set of input queries.

The method 22 may further include a step 42 that includes determining one or more query rewrite candidates based on mapped vectors associated with various queries. In other words, for each possible input query a user may have (as mapped into the vector space identified at the step 40, one or more query rewrite candidates may be determined. The determination of the query rewrite candidates may include determining, for a given query, that an embedding vector for that query is close to other embedding vectors in the search space. The queries associated with those other embedding vectors are determined to be the query rewrite candidates.

In an embodiment, after any treatments (e.g., text cleaning, natural language processing, etc.) used to organize/parameterize the data of the session-query model, a skip-gram model may be used to determine the query rewrite candidates. Skip-gram models receive a target token or entity (e.g., a user query) and output various contexts (e.g., a rewrite candidate) for that token or entity and a probability distribution associated with each of the output contexts (e.g., how likely is the output context token/entity to be found near the input target token/entity). For example, for conditional probabilities $P(s_j|q_i; v_i)$, where $v_i$ denotes a vector representation of query i in the search space, and $$\operatorname*{argmax}_{v_i} \prod_{(s_j, q_i) \in C} P(s_j \mid q_i; v_i), \quad \text{Equation 5}$$

may be used as the objective function for the embedding process. By Equation 4, Equation 5 simplifies to $$\operatorname*{argmax}_{v_i} \prod_{k=1}^{V} \frac{\exp(v_k^T \cdot v_i)}{\sum_{k'=1}^{N} \exp(v_{k'}^T \cdot v_i)}. \text{Or,} \qquad \text{Equation 6}$$

$$\operatorname*{argmax}_{v_i} \prod_{k=1, k \neq i}^{V} \left[ ]v_k^T \cdot v_i - \log \left( \sum_{k'=1}^{N} \exp(v_{k'}^T \cdot v_i) \right) \right], \qquad \text{Equation 7}$$

after log-transformation, where N is defined as in Equation 1 and $V=|\{q_k : q_k \in C\}|$, respectively.

To improve training efficiency of the query rewrite model and allow negative sampling (e.g., inputting query relationships with low probabilities of appearing together, which can improve the functioning of the kip-gram model), Equation 7 may be modified as $$\operatorname*{argmax}_{v_i} \left[ \prod_{k=1, k \neq i}^{V} \log \sigma(v_k^T \cdot v_i) + \sum_{k'=1, k' \neq i}^{V'} \log \sigma(-v_{k'}^T \cdot v_i) \right], \qquad \text{Equation 8}$$

where V' is the size of negative samples of $(s_j, q_i)$, and $\sigma(x)$ is the sigmoid function:

$$\sigma(x) = \frac{1}{1 + e^{-x}}. \qquad \text{Equation 9}$$

Accordingly, a query rewrite model may be used to determine rewrite candidates for a given search query using a skip-gram model, where a target (e.g., a user-input query) is input and multiple context results (e.g., the query rewrite candidates) are output based on the mapping of vectors in the search space associated with individual queries.

The method 22 may further include a step 44 that includes storing the determined query rewrite candidates associated with possible product queries into a lookup table, such as the lookup tables 30 of FIG. 2. In this way, when a product query is received from a user, that product query (or on similar to the product query) may be located in the lookup table to determine one or more query rewrites for the product query.

In an embodiment, low performing query criteria may be used to determine when to implement a query rewrite method, such as the method 22. For example, a low performing query (LPQ) may be a query for which a click-through rate (CTR) may be less than a predetermined threshold (e.g., 20%), where the click-through rate may be defined as $$CTR = \frac{\# \text{ of clicks from impression}}{\# \text{ of searches}}. \qquad \text{Equation 10}$$

In other words, the click-through rate will be higher for queries where users find the desired results, while the CTR may be lower where users did not find what they were looking for and had to do additional searching. Where the CTR is above a predetermined threshold, a query rewrite may not be used, and where CTR is below the predetermined threshold, a query rewrite as described herein may be used. In other words, in some embodiments, a query may only be rewritten if the query is classified as an LPQ. Similarly, in some embodiments, the lookup table may only be populated with query rewrite candidates that are considered LPQ's.

For whichever queries are considered low-performing, one or more query rewrite candidates may be generated based on a multiplicative combination objective. Results may be stored in a lookup table. For example, after being determined, the query rewrite candidates may be cached in an in-memory database like Redis™ with periodic (e.g., daily, weekly, etc.) re-indexing on a predetermined schedule.

A minimum threshold of queries may be required before rewrite query candidates are determined for that particular query. For example, rewrite query candidates may only be determined for queries that are searched at least 10 times or more on an annual basis. As another example, top three query rewrite candidates for a product query "bicycle chain tool" calculated using the methods described herein may be a "chain breaking tool," a "chain repair tool," and a "chain remover."

Evaluation of a query rewrite system has been completed by expert inspection based on random sampling. For example, a Precision@k or P@k evaluation metric was used, given a threshold $\theta_0$. For example, given a particular LPQ, for all query rewrites with similarity distance greater than or equal to a presumed threshold, the proportion of the top k rewrites that are relevant, where relevancy is generally considered as retaining the same customer intent as the original query. For instance, for the query "oil lantern," rewrite candidate "old lamp" is considered relevant, whereas "lamp" is not. Relevancy was judged by a combination of expert opinions and/or expert systems.

Mathematically, the P@k may be defined as $$P@k = \frac{\# \text{ of relevant query rewrites } @k}{\# \text{ of query rewrites } @k}, \qquad \text{Equation 11}$$

where k may be set as three (3) to balance recall and latency. Input queries with CTR of 20% or less were first allocated into M categories based on an in-house query classifier. A random sampling was applied to each category to estimate P@3. For each category, a mean average precision (MAP) was used as the final metric.

A variable $p_i$ was denoted as the population MAP of category i, and $\hat{p}_i$ was denoted as the corresponding sample MAP. An error rate $h_i$ was introduced as well as a confidence level $C_i$, such that $$P\left( \left| \frac{\hat{p}_i - p_i}{p_i} \right| < h_i \right) = C_i. \qquad \text{Equation 12}$$

Variables were set $h_i \in [0:01; 0:05]$ and $C_i \in [0:95; 0:99]$, for example depending on revenue impacts of an individual category. A sampling approach was designed to ensure that $C_i$ of the time the sampled proportion was not more than $h_i$ different from the population proportion.

To determine a sample size, $N_i$ may be the size of category i, and the sample size $n_i$ was calculated as $$\begin{cases} n_{i0} = \dfrac{z_{\alpha_i}^2 (1 - p_i)}{h_i^2 p_i} \\ n_i = \dfrac{n_{i0}}{1 + (n_{i0} - 1)/N_i} \end{cases}, \qquad \text{Equation 13}$$

where $\alpha_i = (1 - C_i) = 2$, and $z_\alpha$ is the upper $\alpha_i/2$ quantile of the standard normal distribution such that $$P(Z < z_{\alpha_i}) = 1 - \frac{\alpha_i}{2}, Z \sim N(0, 1).$$ Equation 14

To conduct the evaluation, one year of search log was used as the targeted population. To make the evaluation more commercially valuable, the population was separated into three groups based on search volume and revenue impact. Those groups were called herein Head, Medium, and Tail. For group, a random sample of one thousand queries was drawn incrementally until estimation saturates. Given a query, the suggested query rewrite was considered positive if the rewrite is semantically similar and/or the rewrite has at least 40% more click-through than the original query. Example metrics determined from such a system are presented below in Table 1:

| Categories | Population Size | Sample Size | MAP@3 | Confidence |
|---|---|---|---|---|
| A | 160K | 1.6K (1%) | 0.99 | 95% |
| B | 6.8M | 1K (0.01%) | 0.95 | 95% |
| C | 7M | 1K (0.01%) | 0.8 | 95% |
| D | 10M | 1K (0.01%) | 0.85 | 95% |

Accordingly, session-query embedding methods as described herein may be used to generate query rewrites that retain an original query intent. The systems and methods herein may not only able to improve LPQ but also may help with various potential applications. For example, by training the session-query embedding properly to maintain similar (intent) queries within closer proximity, domain-specific sense and entity disambiguation may be generated, likely intents for broad queries may be estimated, and entity linking may be accomplished. Such methods may advantageously be implemented on an automated, large-scale with little human intervention.

Various examples are included herein, where confidence levels are indicative of how close the vector of the original query is to a vector of a query rewrite in a search space as described herein. For example, domain-specific word sense disambiguation may be accomplished where an original query is "java" and determined query rewrites include "java trim" with a confidence of 0.885 and "java cabinet" with a confidence of 0.862. This is a domain-specific case because "java" may normally be associated with a geographic location, for example. However, in a particular context, such as the home-improvement space, the systems and methods herein may automatically recognize that "java" may be rewritten as a query not related to a geographic location, but rather as a color of home improvement products. An example query of "coffee" may, for example, exclude any tea related rewrites, yielding rewrites of "coffee pods" with a confidence of 0.962 and "k cups" with a confidence of 0.95. Intent inference for broad queries is also demonstrated, where a query of "furniture" yields a rewrite of "living room furniture" with a confidence of 0.952. Domain-specific entity disambiguation that is otherwise spell correct may also be achieved, where a query of "msma" yields rewrites of "atrazine" (0.939 confidence), "quinclorac" (0.933 confidence), "post emergent" (0.928 confidence), "trimec" (0.925 confidence), and "selective herbicide" (0.921 confidence).

In the inventors' experimentation, queries rewritten according to an example embodiment of the present disclosure was shown to improve CTR for specific low performing queries (LPQs). For example, CTR improved 3× when LPQ "big fans" was rewritten as "heavy duty fans" according to the embodiments described herein. CTR improved 8× when LPQ "weed eater part" was rewritten as "gas trimmer parts" according to the embodiments described herein. CTR improved 5× when LPQ "kitchen area rug" was rewritten as "kitchen runners" according to the embodiments described herein. CTR improved 3× when LPQ "coffee pots" was rewritten as "coffee makers" according to the embodiments described herein. As a final example, CTR improved 2× when LPQ "wireless outdoor speaker" was rewritten as "bluetooth outdoor speaker" according to the embodiments described herein.

In addition to rewriting queries, various embodiments described herein may be used in further implementations. Although users often do not enter search terms into a search engine in natural language, the information determined using the various embodiments described herein may be used to enhance natural language processing (NLP) methods and systems. NLP methods and systems may be used, for example, for text classification (e.g., to determine meaning of a customer question in a chat bot), to perform text memorization (e.g., in generalizing customer reviews online), etc. However, some words may be rare (e.g., do not appear often, appear with rare misspellings), leading to a small sample size for training or applying NLP for the rare words. Thus, the NLP system or method may have difficulty determining meaningful information for rare words. Because the query rewrite embodiments described herein treat entire search queries that are often more than one word long as tokens, the query rewrite embodiments herein may also not offer the single word token embedding that is helpful for NLP tasks. Accordingly, described herein is embodiments for utilizing the output mapped vectors generated for search queries in the query rewrite embodiments herein in a way that provides useful single word embeddings for NLP systems.

Figure 4:
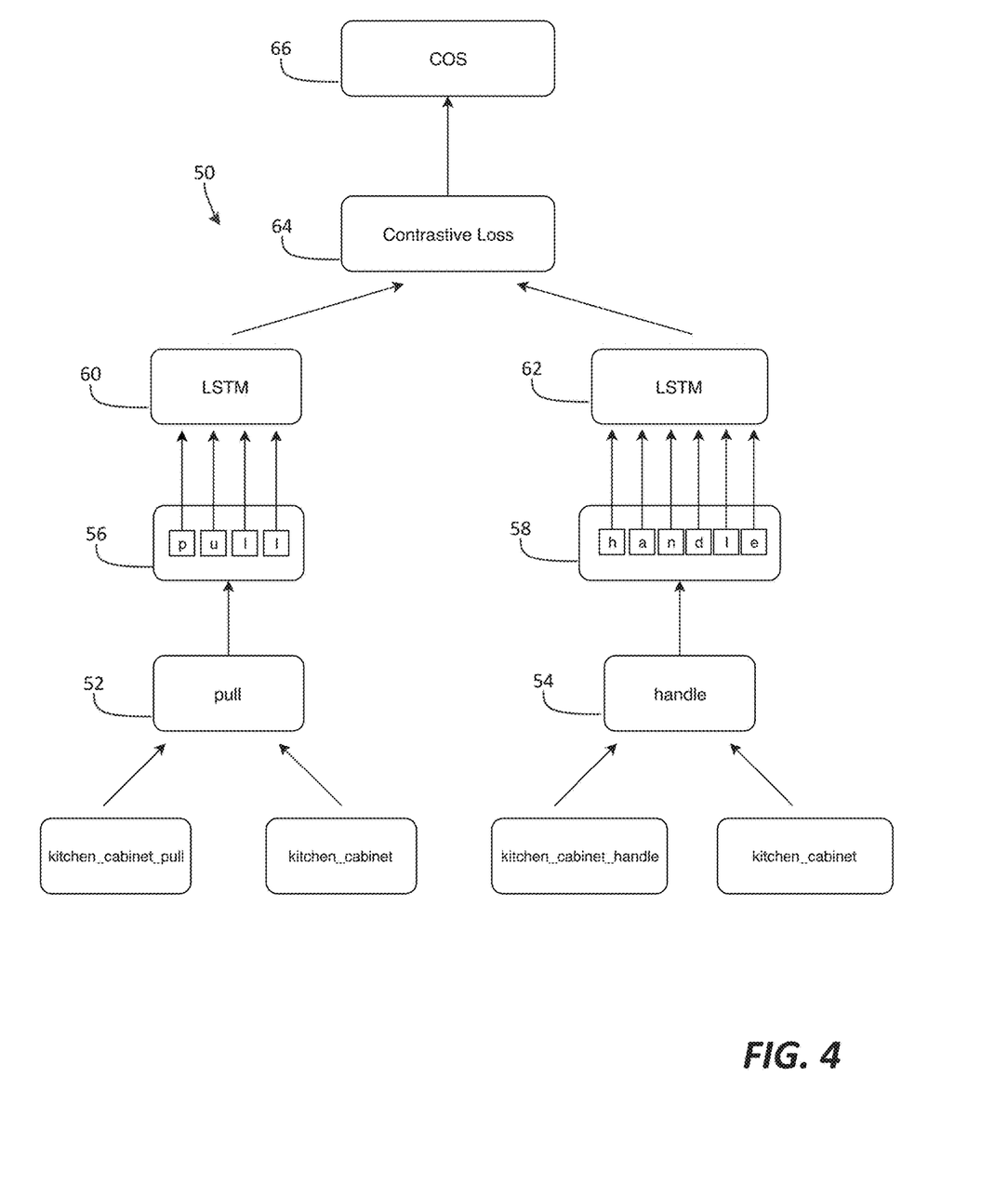
FIG. 4 is a flow chart illustrating an example method of using query vector mappings in a Siamese recurrent network, in embodiments.

Thus, the embodiments described herein may be used to backfill an NLP system or method to provide information about rare words (although the systems and methods described herein may also be used to provide information about words that are not rare). For example, the mapped vectors that are determined as part of a query rewrite process (e.g., the method 22 described herein) may be compared to one another with respect to individual words. For example, query pairs associated with one another (e.g., vectors that are close to one another) may be determined that only differentiate from one another based on a target word. As an example, a unigram language model may be used as the NLP system. A word2vec model may be used to capture these relationships between words based on the vectors. For example, with V being a mapped vector, the word2vec model captures word relations such that $V_{king} - V_{man} = V_{woman} - V_{queen}$. Once the relationships are determined, those relationships may be used as embeddings in a neural network to train an NLP system to better determine the meaning and/or context of words. Such a neural network may be, for example, a Siamese recurrent network. FIG. 4 is a flow chart illustrating an example method 50 of using query vector mappings in a Siamese recurrent network, in embodiments.

To better determine word relationships, the difference between more than one query pair for the same target work/token may be used. For example, an average of the difference in a predetermined number of query pairs (e.g., 3, 5, 10, etc.) that differ only by the target word may be used as initial embeddings for a neural network used to train an NLP system. For example, the initial embedding for the target word/token "pull" may be an average of $V_{kitchen\ cabinet\ pull} - V_{kitchen\ cabinet}, V_{bathroom\ cabinet\ pull} - V_{bathroom\ cabinet}, V_{laundry\ room\ cabinet\ pull} - V_{laundry\ room\ cabinet}$, etc. (where V represents a mapped vector associated with a query). The initial embedding for pull based on comparison of queries that differ by the word pull is shown at 52 of FIG. 4, and an initial embedding for handle is shown at 54. For a given character within the target word (e.g., the letter p), the initial word embeddings may be averaged for of all words/tokens that contain the character weighted by corresponding word/token frequency. The initial embedding for a character p may be the mean vector of all words/tokens with a p in it (e.g., pull, stipulate, popular, etc.), weighted by the respective frequencies of each term. This character embedding for pull and handle is shown at 56 and 58, respectively, in FIG. 4. This may capture domain specific word senses and word relations in order to fine-tune word embeddings. Thus, the embeddings for the neural network may be backfilled using information from the query rewrite process. The character embeddings for a word/token may then be used to determine similarities between words/tokens that have similar meanings, as described further below and shown in 60, 62, 64, and 66 of FIG. 4. Formally, for character embeddings, denote $x_i$ for word/token i and $y_j$ for character j that appears in token i, write $V_{yj}$ as:

$$V_{yj} = \frac{1}{|C|} \sum_{y_j \in x_i, \forall x_i \in C} \frac{f_{x_i}}{\sum_{x_i \in C} f_{x_i}} \cdot V_{x_i}, \quad \text{Equation 15}$$

where C is the set of words/tokens that contain $y_j$ and $f_{xi}$ is the term frequency of $x_i$. $V_{xi}$ is defined as:

$$V_{x_i} = \frac{1}{|S|} \sum_{q_j \in S} (V_{q_j} - V_{q_j \setminus x_i}), \quad \text{Equation 16}$$

where S denotes the set of all queries $q_j$ that contains the target word/token $x_i$.

As an example, for a target word, queries containing a target word that co-occur in at least three (3) user search sessions within a threshold distance of one another according to the mapped vectors (e.g., with a cosine distance or confidence level greater or equal to 0.9) may be used as embeddings for the neural network. For example, words included in queries such as "ryobi drill bit" and "drill bit ryobi" that are be located within the threshold distance of one another in the vector space may be defined as related. Therefore, those phrases ("ryobi drill bit" and "drill bit ryobi") may be fed into a neural network so that the meaning of the word "Ryobi™" may be better understood in context. Negative correlations of queries where a target word co-occurs (e.g., are outside a threshold distance from one another such as with a cosine distance or confidence level greater or equal to 0.1) may also be fed into a neural network as initial embeddings to further provide context for words. For example, for the target word "pot," the queries that share the word "pot" "tea pot" and "flower pot" may be associated with vectors that are quite far from one another as mapped in the vector space. Accordingly, those query phrases may be used as initial embeddings representing a negative correlation for the word "pot."

The initial embeddings based on query vectors may be used to determine positively related different words/tokens using an NLP system. In other words, the initial embeddings determined as described herein with positive and negative correlations may also indicate relationships between different word/token pairs. For example, initial character embeddings (e.g., as determined at 56 and 58 of FIG. 4), may be used in a neural network for training a NLP system. A Siamese recurrent network may be used as the neural network as shown in FIG. 4. In FIG. 4, initial embeddings for the word/token pair pull and handle are fed into long short-term memory (LSTM) recurrent neural networks at 60 and 62. The output of those networks is then compared using a contrastive loss function at 64. A cosine function may be applied at 66 to yield a numerical score or indication of how related the two words/tokens (e.g., pull and handle) are. The contrastive loss function and the cosine function applied at 64 and 66 are used to determine semantically similar examples (e.g., different words that are used in similar contexts or have similar meanings in a given context). With the example of pull and handle, since those words appear often in queries with similar words (e.g., kitchen, cabinet, etc.), the contrastive loss function may indicate that the words pull and handle may have similar meanings when they appear with or near the words kitchen, cabinet, etc.

For example, positively related pairs of words/tokens (e.g., stove vs. range) may be selected when they co-occur at least a threshold number of times (e.g., ten (10) times) in similar queries that are within a threshold cosine distance (e.g., greater or equal to 0.75). Negatively related pairs of words/tokens (e.g., saw vs. drill) may be sampled from queries that are less that a threshold cosine distance from one another (e.g., a cosine distance less than 0.1). Accordingly, NLP systems may be enhanced using search queries as described herein.

Figure 5:
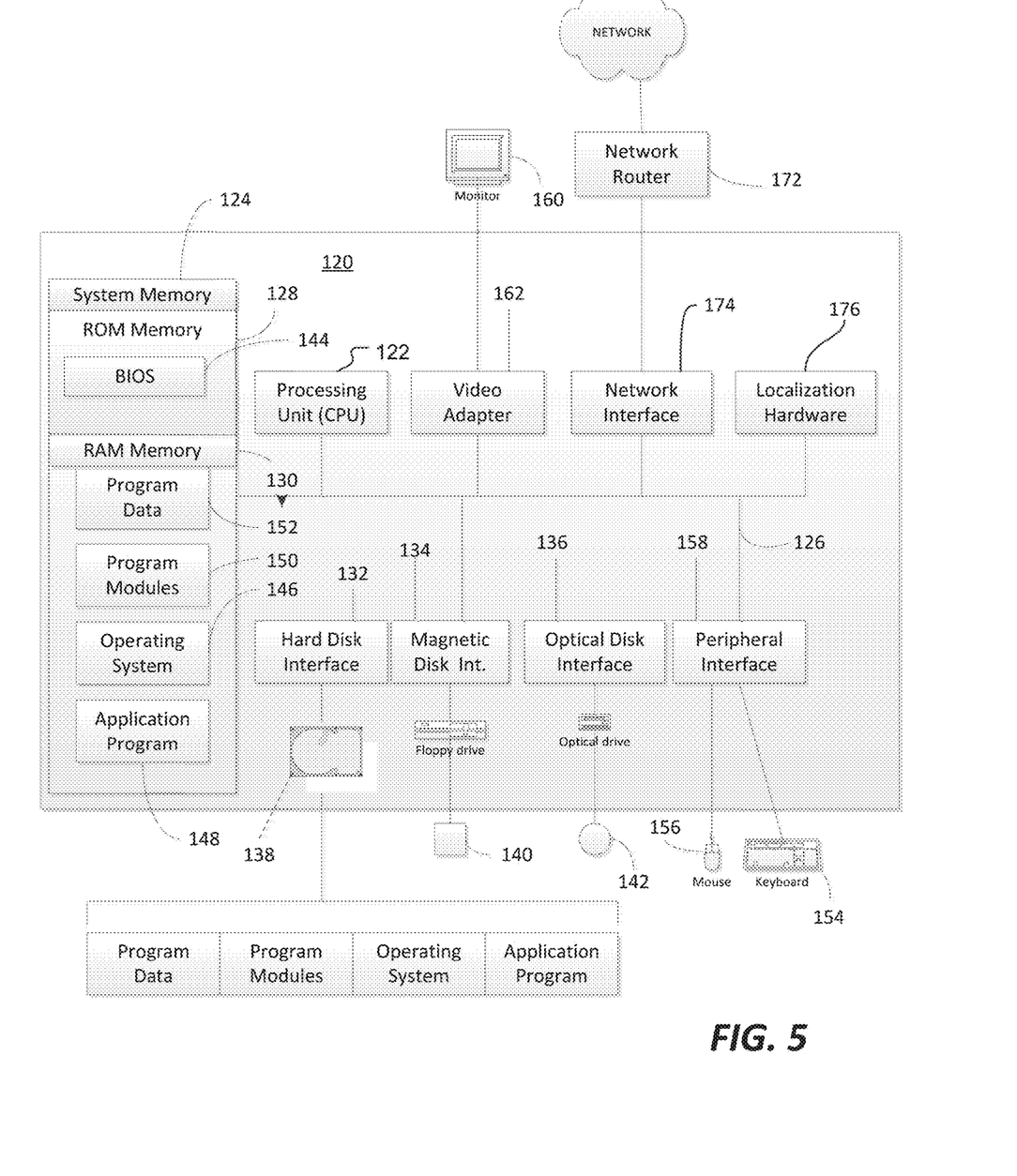
FIG. 5 is a diagrammatic view of an example user computing environment, according to some embodiments.

FIG. 5 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method, comprising:
receiving, by one or more processors of one or more computing devices, a plurality of product query arrays each comprising a plurality of individual product queries received during a single user search session;

inputting, by the one or more processors, the plurality of product query arrays into a query rewrite model, wherein text of each of the plurality of individual product queries in each product query array is treated as a whole token;

determining a plurality of vectors based on the plurality of product query arrays;

selecting a query rewrite candidate for each of the plurality of vectors;

storing the query rewrite candidate along with each of the plurality of vectors in a lookup table on a memory;

receiving, by the one or more processors, a product query from a user electronic device;

determining, by the one or more processors, a query rewrite for the product query using the query rewrite model comprising:

looking up a closest one of the plurality of vectors that includes search terms similar to the product query in the memory; and determining based on the closest one of the plurality of vectors an associated query rewrite candidate stored in the memory to use as the query rewrite;

determining, by the one or more processors, search results for the product query using the query rewrite; and sending, by the one or more processors to the user electronic device, information for presenting the search results on a display of the user electronic device responsive to the product query.

2. The computer-implemented method of claim 1, wherein the query rewrite model determines the query rewrite by:

determining a plurality of vectors based on the plurality of product query arrays;

selecting one of the plurality of vectors that includes search terms similar to the product query; and selecting a query rewrite based on the selected one of the plurality of vectors as the query rewrite.

3. The computer-implemented method of claim 1, wherein each of the plurality of product query arrays are ordered to reflect an order in which the plurality of individual product queries was received during each single user search session.

4. The computer-implemented method of claim 1, further comprising lemmatizing high volume search terms of the text of each of the plurality of individual product queries in each product query array before inputting the plurality of product query arrays into the query rewrite model.

5. The computer-implemented method of claim 1, further comprising excluding all punctuation except quotation marks and apostrophes from the text of each of the plurality of individual product queries in each product query array before inputting the plurality of product query arrays into the query rewrite model.

6. The computer-implemented method of claim 1, further comprising:

determining new product query rewrites on a predetermined schedule using the query rewrite model; and updating the lookup table with the new product query rewrites.

7. The computer-implemented method of claim 1, further comprising:

determining a historical click-through rate for the product query; and determining the query rewrite in response to determining that the historical click-through rate for the product query is below a predetermined threshold.

8. The computer implemented method of claim 1, wherein the query rewrite model is a uni-gram language model.

9. A computer-implemented method, comprising:

receiving, by one or more processors of one or more computing devices, a product query from a user electronic device;

determining, by the one or more processors, a query rewrite for the product query based on a query rewrite model, wherein the query rewrite model is configured to determine the query rewrite by:

comparing the product query to vectors representing a plurality of product query arrays each comprising a plurality of individual product queries received during a single user search session, wherein text of each of the plurality of individual product queries in each product query array is treated as a whole token;

determining one of the vectors that is closest to a product query vector; and determining a query rewrite based on the determined one of the vectors;

determining, by the one or more processors, search results for the product query using the query rewrite; and sending, by the one or more processors to the user electronic device, information for presenting the search results on a display of the user electronic device responsive to the product query.

10. The computer-implemented method of claim 9, wherein each of the plurality of product query arrays are ordered to reflect an order in which the plurality of individual product queries was received during each single user search session.

11. The computer-implemented method of claim 9, further comprising lemmatizing high volume search terms of text of the product query before determining the query rewrite.

12. The computer-implemented method of claim 9, further comprising excluding all punctuation except quotation marks and apostrophes from text of the product query before determining the query rewrite.

13. The computer-implemented method of claim 9, further comprising:

determining a historical click-through rate for the product query; and determining the query rewrite in response to determining that the historical click-through rate for the product query is below a predetermined threshold.

14. The computer implemented method of claim 9, wherein the query rewrite model is a uni-gram language model.

15. A computer-implemented method, comprising:

receiving, by one or more processors of the one or more computing devices, a product query from a user electronic device;

determining, by the one or more processors, a query rewrite for the product query by retrieving, from a lookup table, a query rewrite candidate related to the product query, wherein the lookup table is generated using a query rewrite model by:

inputting a plurality of product query arrays each comprising a plurality of individual product queries received during a single user search session into the query rewrite model, wherein text of each of the plurality of individual product queries in each product query arrays is treated as a whole token;

generating vectors representing the plurality of product query arrays;
determining a query rewrite candidate for each of the vectors; and
storing the vectors and each respective query rewrite candidate in the lookup table;
determining, by the one or more processors, search results for the product query using the query rewrite; and
sending, by the one or more processors to the user electronic device, information for presenting the search results on a display of the user electronic device responsive to the product query.

16. The computer-implemented method of claim 15, wherein each of the plurality of product query arrays are ordered to reflect an order in which the plurality of individual product queries was received during each single user search session.

17. The computer implemented method of claim 15, wherein the query rewrite model is a uni-gram language model.

18. The computer-implemented method of claim 15, further comprising:
determining a historical click-through rate for the product query; and
determining the query rewrite in response to determining that the historical click-through rate for the product query is below a predetermined threshold.

19. A non-transitory computer-readable medium having stored thereon instructions that are executable by a processor to cause a system to perform operations comprising:
receive a product query from a user electronic device;
determine a query rewrite for the product query based on a query rewrite model, wherein the query rewrite model is configured to determine the query rewrite by:
compare the product query to vectors representing a plurality of product query arrays each comprising a plurality of individual product queries received during a single user search session, wherein text of each of the plurality of individual product queries in each product query array is treated as a whole token;
determine one of the vectors that is closest to a product query vector; and
determine a query rewrite based on the determined one of the vectors;
determine search results for the product query using the query rewrite; and
send, to the user electronic device, information for presenting the search results on a display of the user electronic device responsive to the product query.

20. The non-transitory computer-readable medium of claim 19, wherein each of the plurality of product query arrays are ordered to reflect an order in which the plurality of individual product queries was received during each single user search session.

21. The non-transitory computer-readable medium of claim 19, wherein the instructions further cause the system to perform operations comprising:
lemmatize high volume search terms of text of the product query before determining the query rewrite.

22. The non-transitory computer-readable medium of claim 19, wherein the instructions further cause the system to perform operations comprising:
exclude all punctuation except quotation marks and apostrophes from text of the product query before determining the query rewrite.

23. The non-transitory computer-readable medium of claim 19, wherein the instructions further cause the system to perform operations comprising:
determine a historical click-through rate for the product query; and
determine the query rewrite in response to the determination that the historical click-through rate for the product query is below a predetermined threshold.

24. The non-transitory computer-readable medium of claim 19, wherein the query rewrite model is a uni-gram language model.

25. A non-transitory computer-readable medium having stored thereon instructions that are executable by a processor to cause a system to perform operations comprising:
receive a product query from a user electronic device;
determine a query rewrite for the product query by retrieving, from a lookup table, a query rewrite candidate related to the product query, wherein the lookup table is generated using a query rewrite model by:
input a plurality of product query arrays each comprising a plurality of individual product queries received during a single user search session into the query rewrite model, wherein text of each of the plurality of individual product queries in each product query arrays is treated as a whole token;
generate vectors representing the plurality of product query arrays;
determine a query rewrite candidate for each of the vectors; and
store the vectors and each respective query rewrite candidate in the lookup table;
determine, by the one or more processors, search results for the product query using the query rewrite; and
sending, by the one or more processors to the user electronic device, information for presenting the search results on a display of the user electronic device responsive to the product query.

26. The non-transitory computer-readable medium of claim 25, wherein each of the plurality of product query arrays are ordered to reflect an order in which the plurality of individual product queries was received during each single user search session.

27. The non-transitory computer-readable medium of claim 25, wherein the query rewrite model is a uni-gram language model.

28. The non-transitory computer-readable medium of claim 25, wherein the instructions further cause the system to perform operations comprising:
determine a historical click-through rate for the product query; and
determine the query rewrite in response to the determination that the historical click-through rate for the product query is below a predetermined threshold.

* * * * *